United States Patent
Yoshida et al.

(10) Patent No.: US 7,524,476 B2
(45) Date of Patent: Apr. 28, 2009

(54) VACUUM ULTRAVIOLET EXCITED GREEN PHOSPHOR MATERIAL AND LIGHT-EMITTING DEVICE USING THE SAME

(75) Inventors: Hisashi Yoshida, Shinagawa-ku (JP); Ryo Yoshimatsu, Shinagawa-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/099,515

(22) Filed: Apr. 8, 2008

(65) Prior Publication Data

US 2008/0193355 A1    Aug. 14, 2008

Related U.S. Application Data

(63) Continuation of application No. 10/986,251, filed on Nov. 12, 2004, now Pat. No. 7,375,459.

(30) Foreign Application Priority Data

Nov. 13, 2003    (JP) .............................. 2003-383826

(51) Int. Cl.
*C01F 17/00* (2006.01)
*C09K 11/08* (2006.01)

(52) U.S. Cl. .................. 423/263; 313/486; 313/584; 313/637; 252/301.4 R

(58) Field of Classification Search ................ 423/263; 313/486, 584; 252/301.4 R
See application file for complete search history.

(56) References Cited

U.S. PATENT DOCUMENTS

| 4,314,910 | A |   | 2/1982 | Barnes |
|---|---|---|---|---|
| 4,810,416 | A |   | 3/1989 | Hase et al. |
| 5,600,202 | A |   | 2/1997 | Yamada et al. |
| 6,090,310 | A |   | 7/2000 | Rao et al. |
| 7,205,710 | B2 | * | 4/2007 | Justel et al. ............ 313/486 |
| 2003/0141484 | A1 |   | 7/2003 | Yamada et al. |

| 2005/0062398 | A1 |   | 3/2005 | Yoshida et al. |

FOREIGN PATENT DOCUMENTS

| DE | 30 29 389 C2 | 2/1981 |
|---|---|---|
| JP | 53-31584 | 3/1978 |
| JP | 56-167783 A | 12/1981 |
| JP | 7-242872 A | 9/1995 |
| JP | 2001-123164 A | 5/2001 |
| JP | 2001-123165 A | 5/2001 |
| JP | 2001-172624 A | 6/2001 |
| JP | 2001-172625 A | 6/2001 |
| JP | 2001-172626 A | 6/2001 |
| JP | 2001-303047 A | 10/2001 |
| JP | 2001-335777 A | 12/2001 |
| JP | 2003-050561 A | 2/2003 |
| JP | 2003-096447 A | 4/2003 |
| JP | 2003-096448 A | 4/2003 |
| JP | 2003-155481 A | 5/2003 |
| JP | 2003-297291 A | 10/2003 |

OTHER PUBLICATIONS

"Lighting", Ullmann's Encyclopedia of Industrial Chemistry, 5$^{th}$ edition, 1999, p. 536, vol. A 15.

* cited by examiner

*Primary Examiner*—Vickie Kim
*Assistant Examiner*—Joseph V Micali
(74) *Attorney, Agent, or Firm*—Sughrue Mion, PLLC

(57) ABSTRACT

This invention is intended to overcome the problems with conventional phosphor materials, specifically to overcome the problems of insufficient luminance and of color impurity on the screens of color display units when green phosphor materials have blue or red light emission. This invention is intended to provide vacuum ultraviolet excited green phosphor materials that include terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$). The phosphor materials of this invention can be used for light-emitting devices. Using the phosphor materials in combination with blue phosphor materials and red phosphor materials enables the formation of white emitting device.

8 Claims, 2 Drawing Sheets

VACUUM ULTRAVIOLET EXCITED GREEN PHOSPHOR MATERIAL AND LIGHT-EMITTING DEVICE USING THE SAME

BACKGROUND OF THE INVENTION

1. Field of the Invention

This invention relates to a vacuum ultraviolet excited green phosphor material and a light-emitting device using the same.

2. Description of the Related Art

At the present time, fluorescent lamps containing mercury are in common use as illumination. This mercury vapor lamp generates ultraviolet radiation using mercury vapor discharge and then causes 3 phosphor materials, R (red: red wavelength region with peak emission wavelength of 600 to 615 nm), G (green: green wavelength region with peak emission wavelength of 535 to 570 nm) and B (blue: blue wavelength region with peak emission wavelength of 440 to 470 nm) (hereinafter abbreviated as R.G.B), to emit light to illuminate a white fluorescent lamp. However, these fluorescent lamps use in their inside mercury harmful to the environment and therefore the development of mercury-free fluorescent lamps, which use rare gases such as xenon, are being actively pursued. The mercury-free fluorescent lamps containing xenon gas emit vacuum ultraviolet light using xenon discharge and cause the phosphor materials of 3 colors, R. G. B, to emit light to yield white light.

On the other hand, in conventional display units using a CRT system, their weight and thickness are becoming problematic with the recent growing tendency toward large-sized display screens and there have been strong demands for light-weight and thin type display units. As a result, the development of flat flat-panel displays such as plasma display panels and liquid crystal displays are being actively pursued.

In plasma display panels, color display is obtained by generating plasma by electrical discharge in rare gas, producing vacuum ultraviolet light through the generated plasma, and causing phosphor materials of 3 pixel colors, R, G and B, to emit light by the vacuum ultraviolet excitation.

In liquid crystal displays, on the other hand, since they are not self luminous type of displays, reflection type displays, which use external light, and backlight type displays, which use back light on the back side of liquid crystal, are used. In large-sized liquid crystal displays, however, backlight type is commonly used. To provide color display, a backlight emits white light, which contains R, G and B light, from the back side of a liquid crystal device and a color filter separates the white light transmitting the liquid crystal device into R, G and B.

The phosphor materials used in the plasma display panels and backlights of liquid crystal displays are also required to have optical characteristics such as luminance, chromaticity and aging characteristic of the same.

Japanese Patent Laid-Open No. 2003-297291 discloses cerium, terbium-doped lanthanum phosphate ($LaPO_4$: Tb, Ce) and terbium-doped magnesium cerium aluminate ($CeMgAl_{11}O_{19}$: Tb) phosphor materials as green phosphor materials whose emission peak wavelengths are at 505 to 535 nm.

Further, Japanese Patent Laid-Open No. 2003-96448 discloses aluminum borate green phosphor materials represented by the formula: $Y_{1-a-b}Gd_aTb_bAl_3(BO_3)_4$ ($0.3 \leq a \leq 0.55$, $0.003 \leq b \leq 0.44$) which have high luminance and are low in decrease of luminance due to their exposure to plasma.

Fluorescent lamps using xenon discharge, which have lately attracted considerable attention as mercury-free fluorescent lamps, are poor in energy conversion efficiency compared with fluorescent lamps using mercury discharge. To use them in household applications, they are required to have high luminance. If the luminance of xenon fluorescent lamps is increased to the same level as that of mercury fluorescent lamps and is put to practical use, power consumption can be reduced. Thus, it is indispensable to increase the luminance of phosphor materials.

Plasma displays and liquid crystal displays are alternatives to cathode ray tubes. To allow them to be used in homes, they are also required to have high luminance. However, in plasma display panels in current use, it is hard to say that they have luminance that fully meets such a requirement. In liquid crystal displays, since their luminance is obtained from their backlights, the requirement can be met by increasing the luminance of the backlights. However, from the viewpoint of power consumption, there have been demands for more efficient and thinner liquid crystal displays. Thus, it is indispensable to increase the luminance of fluorescent tubes which enable the easy formation of flat light-emitting devices.

Meanwhile, there have been strong demands for higher luminance and higher color purity of the green phosphor materials shown in the description of prior art.

Demands for increase in luminance and improvement in color purity are particularly noticeable in plasma display panels. This may have to do with the fact that the system of TV broadcasting is moving toward the Hi-Vision digital production system from the conventional NTSC system. The Hi-Vision digital production system requires 1920×1080 pixels Full Spec; however, the current 37" to 42" plasma display panels have only 1024×768 pixels. And if plasma display panels are produced while maintaining the current pixel sizes, the resultant panels are 55" to 63" ones. For around 40" plasma display panels, which are of size commonly used in homes, to comply with the standard of Hi-Vision full spec, it is necessary to decrease the pixel size to ⅔ or less of the current one. If the pixel size is decreased to ⅔ of the current size, the luminance of the phosphor materials is required to be 1.5 times or more as much as that of the current luminance. Thus, it is indispensable to increase the luminance of the phosphor materials.

There also exists a problem of color purity with conventional phosphor materials. For example, when the green phosphor materials have blue- or red-emission, color impurity may occur.

This invention is intended to provide phosphor materials that overcome the above described problems.

SUMMARY OF THE INVENTION

This invention is intended to provide vacuum ultraviolet excited green phosphor materials that include terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$).

This invention is also intended to provide ultraviolet fluorescent light-emitting devices including: a light-transmitting sealed container; a discharge medium sealed into the above light-transmitting sealed container for emitting vacuum ultraviolet light; discharge electrodes; and a phosphor layer formed on the inside of the above light-transmitting sealed container, characterized in that the phosphor layer contains a vacuum ultraviolet excited green phosphor material that includes terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$). This invention is also intended to provide white light emitting devices including: a light-transmitting sealed container; a discharge medium sealed into the above light-transmitting sealed container for emitting vacuum ultraviolet light; discharge electrodes; and a phosphor layer formed on the inside of the above light-transmitting sealed container, characterized in that the above phosphor layer contains; a vacuum ultraviolet excited green phosphor material that includes terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$); a vacuum ultraviolet excited blue phosphor material; and a vacuum ultraviolet excited red phosphor material.

The phosphor materials of this invention can provide for more efficient green-emitting light sources than any one of conventional ones. Table 1 shows that in the relative integrated luminosity when excited by vacuum ultraviolet light (wavelength 172 nm) using xenon molecule discharge, the phosphor materials are highly efficient. If used in combination with conventional blue phosphor materials (for example, BAM phosphor material) or red phosphor materials (for example, $Y_2O_3$:Eu, $(Y, Gd)BO_3$:EU), the phosphor materials of this invention can be provided as highly efficient white light source.

As is apparent from the values of the chromaticity coordinates shown in Table 1, the color purity of green is better in the phosphor materials of this invention than in conventional green phosphor materials. This is attributed not only to the green light emission at 540 to 550 nm, but also to the fact that blue light emission at around 480 to 500 nm and red light emission at wavelength range longer than 575 nm are weak compared with conventional phosphor materials. Accordingly, display units, such as plasma display panels, having good color purity of the green color, compared with conventional ones, can be provided.

DETAILED DESCRIPTION OF THE INVENTION AND PREFERRED EMBODIMENTS

Figure 1:
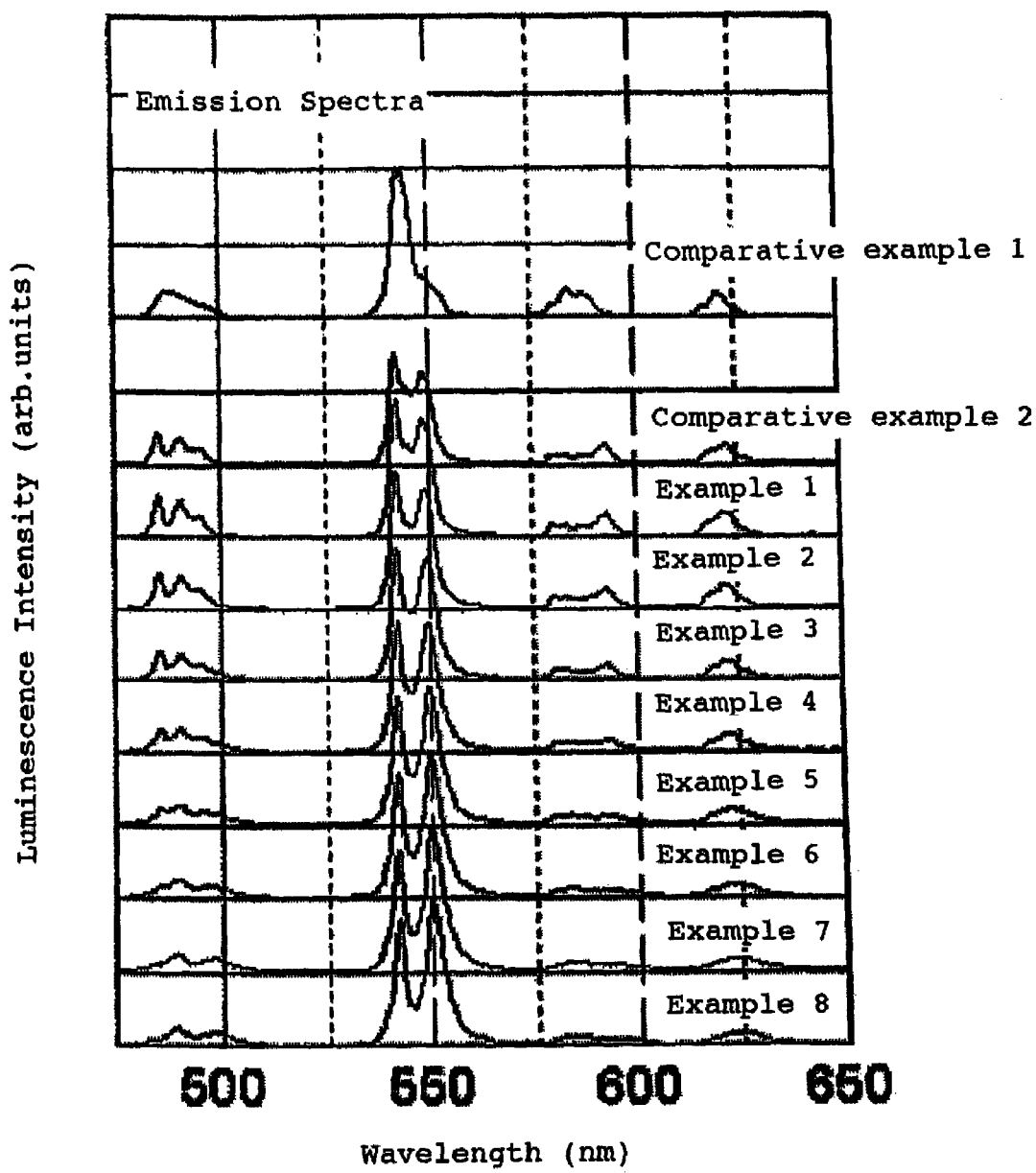
FIG. 1 is a graph showing the emission spectra at wavelengths of examples 1 to 8 and comparative examples 1 and 2 of this invention.
Figure 2:
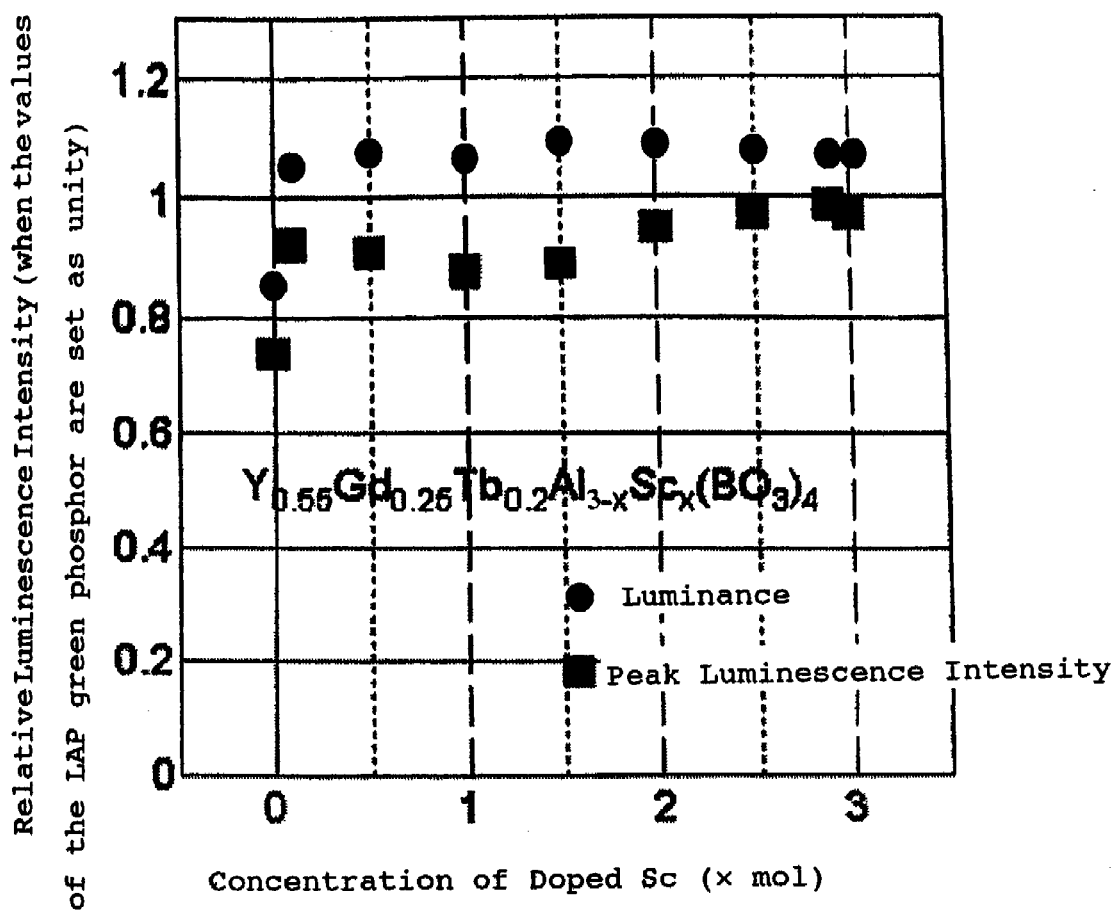
FIG. 2 is a graph showing the relative luminescence intensity of the phosphor materials of this invention versus the concentration of doped Sc.

After intensive research effort, the inventors of this invention found that doping gadolinium (Gd) and terbium (Tb)-doped $YAl_3(BO_3)_4$ crystal with scandium (Sc) in place of a portion of the aluminum (Al) yields phosphor materials that are superior as substitutes for LAP phosphor materials, and they have accomplished this invention. Green luminescence of the phosphor materials of this invention occurs at 540 nm to 550 nm, as shown in FIG. 1. Referring to FIG. 2, it is apparent that doping with scandium for aluminum improves the peak luminescence intensity by up to 26%, compared with the phosphor material, $(Y_{0.55}Gd_{0.25}Tb_{0.2})Al_3(BO_3)_4$, of comparative example 2. Further, FIG. 2 and Table 1 show that doping Sc improves the luminance of the phosphor materials by about 24%.

The phosphor materials as above are applicable to the following products.

1. Fluorescent tube lamps using xenon discharge, which include: a glass tube; a rare gas such as xenon sealed into the glass tube; and the phosphor materials coated on the inner walls of the glass tube.

If the phosphor materials are mixed with blue phosphor materials (for example, BAM phosphor material) and red phosphor materials (for example, $Y_2O_3$:Eu, $(Y, Gd)BO_3$:Eu) which emit light efficiently when exposed to vacuum ultraviolet light and coated on the inside of the glass tube, optimum white fluorescent lamps are produced.

2. Flat fluorescent lamps using xenon discharge, wherein the glass tube of the above products is replaced with sheet-like flat glass.

3. Green pixels of plasma display panels.

EXAMPLES

The vacuum ultraviolet excited phosphor materials of this invention will be described in detail which include terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$).

First, the method will be described of producing the vacuum ultraviolet excited phosphor materials of this invention which include terbium, gadolinium-doped rare-earth aluminum scandium borate represented by the following general formula: $(Y_{1-x-y}Gd_xTb_y)Al_{3-z}Sc_z(BO_3)_4$ ($0 \leq x < 0.5$, $0 < y < 0.5$, $0 < z \leq 3$).

First, yttrium compounds such as yttrium oxide, gadolinium compounds such as gadolinium oxide, terbium compounds such as terbium oxide, aluminum compound such as aluminum oxide, scandium compounds such as scandium oxide, and boron compounds such as boron oxide are used as phosphor raw materials, the raw materials are weighed and picked in accordance with the compositional formula, and blended well by wet or dry blending.

The blend is filled into a heat-resistant receptacle such as an alumina or platinum crucible and pre-fired at 400 to 600° C. in the atmosphere. Then, the pre-fired blend is fired at 900 to 1200° C. in the atmosphere for 3 to 20 hours, and the resultant fired product is grinded, washed, dried and sieved to yield a phosphor material of this invention. The pre-firing and final-firing may be carried out in an acidic atmosphere. And the resultant phosphor material may be re-fired.

The compositions and the relative intensity percentages of the phosphor materials are shown in Table 1. The phosphor material of sample No. 1 will be described by way of an example. The phosphor material was synthesized as follows.

First, 1.218 g of $Y_2O_3$ (Kojundo Chemical Lab. Co., Ltd.), 0.889 g of $Gd_2O_3$ (Kojundo Chemical Lab. Co., Ltd.), 0.733 g of $Tb_4O_7$ (Kojundo Chemical Lab. Co., Ltd.), 2.900 g of $Al_2O_3$ (Kojundo Chemical Lab. Co., Ltd.), 0.135 g of $Sc_2O_3$ (Kojundo Chemical Lab. Co., Ltd.) and 2.730 g of $B_2O_3$ (Kojundo Chemical Lab. Co., Ltd.) were weighed, fully and uniformly blended, filled into an alumina crucible and pre-fired in the atmosphere at 50° C. for 2 hours. The pre-fired blend was heated to 1100° C., fired in the atmosphere for 5 hours, and annealed to yield a fired product. The resultant fired product was ground, washed, dried and sieved to yield a phosphor material, $Y_{0.55}Gd_{0.25}Tb_{0.2}Al_{2.9}Sc_{0.1}(BO_3)_4$.

The phosphor materials of examples 1 to 8 were obtained in accordance with the above described method, while varying the percentages of Y, Gd, Tb and Sc. The percentages of luminance, the percentages of peak luminescence intensity and the CIE chromaticity coordinates (x/y) are shown for the phosphor materials of examples 1 to 8, $LaPO_4$:Tb, Ce [LAP], as comparative example 1, and $Y_{0.55}Gd_{0.25}Tb_{0.2}Al_3(BO_3)_4$, as comparative example 2. The percentages of the luminance of examples 1 to 8 and comparative example 2 are percentages of the luminance of comparative example 1 and the percentages of peak luminescence intensity of examples 1 to 8 and comparative example 2 are percentages of the peak luminescence intensity of comparative example 1.

The measurement of luminance was performed by exposing the phosphor materials to ultraviolet radiations with a xenon lamp wavelength of 172 nm in a bath of nitrogen atmosphere and using a spectrometer, PMA-11, by Hamamatsu Photonics K.K in accordance with the measuring method specified by CIE (Commission Internationale de i'Eclairage).

TABLE 1

|  | Composition | Percentage of Luminance | Percentage of Peak Luminescence Intensity | CIE Chromaticity Coordinates x/y |
|---|---|---|---|---|
| Example 1 | $Y_{0.55}Gd_{0.25}Tb_{0.2}Al_{2.9}Sc_{0.1}(BO_3)_4$ | 106% | 92% | 0.326/0.593 |
| Example 2 | $Y_{0.55}Gd_{0.25}Tb_{0.2}Al_{2.5}Sc_{0.5}(BO_3)_4$ | 108% | 91% | 0.324/0.596 |
| Example 3 | $Y_{0.55}Gd_{0.25}Tb_{0.2}Al_{2.0}Sc_{1.0}(BO_3)_4$ | 107% | 88% | 0.324/0.601 |
| Example 4 | $Y_{0.55}Gd_{0.25}Tb_{0.2}Al_{1.5}Sc_{1.5}(BO_3)_4$ | 110% | 89% | 0.324/0.605 |
| Example 5 | $Y_{0.55}Gd_{0.25}Tb_{0.2}Al_{1.0}Sc_{2.0}(BO_3)_4$ | 109% | 95% | 0.324/0.609 |
| Example 6 | $Y_{0.55}Gd_{0.25}Tb_{0.2}Al_{0.5}Sc_{2.5}(BO_3)_4$ | 108% | 97% | 0.325/0.611 |
| Example 7 | $Y_{0.55}Gd_{0.25}Tb_{0.2}Al_{0.1}Sc_{2.9}(BO_3)_4$ | 107% | 99% | 0.325/0.614 |
| Example 8 | $Y_{0.55}Gd_{0.25}Tb_{0.2}Sc_3(BO_3)_4$ | 107% | 97% | 0.324/0.616 |
| Comparative Example 1 | $LaPO_4$:Tb, Ce [LAP] | 100% | 100% | 0.335/0.587 |
| Comparative Example 2 | $Y_{0.55}Gd_{0.25}Tb_{0.2}Al_3(BO_3)_4$ | 86% | 73% | 0.328/0.592 |

As shown in FIG. 1, the phosphor materials of examples 1 to 8 of this invention emit light at 540 nm to 550 nm. FIG. 2 shows that doping the aluminum with scandium improves the peak luminescence intensity by up to 26%, compared with the phosphor material, $(Y_{0.55}Gd_{0.25}Tb_{0.2})Al_3(BO_3)_4$, of comparative example 2. Further, FIG. 2 and Table 1 show that doping Sc improves the luminance of the phosphor materials by about 24%.

The phosphor materials of this invention can be used for vacuum ultraviolet excited light-emitting devices. The vacuum ultraviolet excited light emitting devices are made up of: a light-transmitting sealed container; a discharge medium sealed into the above light-transmitting sealed container for emitting vacuum ultraviolet light; discharge electrodes; and a phosphor layer formed on the inside of the above light-transmitting sealed container. The phosphor materials of this invention can be used for the phosphor layer. Today, fluorescent lamps and plasma display panels are well known as vacuum ultraviolet excited luminescent devices.

There are disclosed details of well known structures of fluorescent lamps in Japanese Patent Laid-Open No. 2001-172624 etc., but the structures of fluorescent lamps are not limited to the above ones.

There are disclosed details of structures of plasma display panels in Japanese Patent Laid-Open No. 2003-50561, but the structures of plasma display panels are not limited to the above ones.

In plasma display panels, each pixel emits R, G or B light, and thus the phosphor materials of this invention are used independently. In fluorescent lamps, when used for green lamps, the phosphor materials of this invention are also used independently. However, when used for white fluorescent lamp, the green phosphor materials of this invention are used in combination with blue phosphor materials (for example, BAM phosphor material) and red phosphor materials (for example, $Y_2O_3$: Eu, (Y, Gd)$BO_3$: Eu) to form a phosphor layer as a blend of the phosphor materials.

What is claimed is:

1. A method of producing a vacuum ultraviolet phosphor material comprising:
   providing phosphor raw materials selected from the group consisting of yttrium (Y) compounds, gadolinium (Gd) compound, terbium (Tb) compounds, aluminum (Al) compounds, scandium (Sc) compounds, and boron (B) compounds;
   blending the phosphor raw materials to provide a blended material;
   pre-firing the blended material to provide a pre-fired material; and
   firing the pre-fired material to provide a fired material having the following formula:

$(Y_{1-x-y}Gd_xTb_y)Al_{3-z}Sc_z(BO_3)_4 (0<x<0.5, 0<y<0.5, 0<z\leq3)$.

2. The method of producing a vacuum ultraviolet phosphor material according to claim 1, further comprising:
   pre-firing the blended material at a temperature of from 400 to 600° C.

3. The method of producing a vacuum ultraviolet phosphor material according to claim 2, further comprising:
   firing the pre-fired material at a temperature of from 900 to 1200° C.

4. The method of producing a vacuum ultraviolet phosphor material according to claim 3, wherein the pre-fired material is fired for 3 to 20 hours.

5. The method of producing a vacuum ultraviolet phosphor material according to claim 2, wherein the blended material is pre-fired in an acidic atmosphere.

6. The method of producing a vacuum ultraviolet phosphor material according to claim 3, wherein the pre-fired material is fired in an acidic atmosphere.

7. The method of producing a vacuum ultraviolet phosphor material according to claim 3, further comprising:
   grinding, washing, drying and sieving the fired material.

8. The method of producing a vacuum ultraviolet phosphor material according to claim 7, further comprising:
   re-firing the grinded, washed and dried material.

* * * * *